US006853951B2

(12) United States Patent
Jarrell et al.

(10) Patent No.: US 6,853,951 B2
(45) Date of Patent: Feb. 8, 2005

(54) METHODS AND SYSTEMS FOR ANALYZING THE DEGRADATION AND FAILURE OF MECHANICAL SYSTEMS

(75) Inventors: Donald B. Jarrell, Kennewick, WA (US); Daniel R. Sisk, Richland, WA (US); Darrel D. Hatley, Kennewick, WA (US); Leslie J. Kirihara, Richland, WA (US); Timothy J. Peters, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 10/316,199

(22) Filed: Dec. 9, 2002

(65) Prior Publication Data

US 2004/0030524 A1 Feb. 12, 2004

Related U.S. Application Data

(60) Provisional application No. 60/339,042, filed on Dec. 7, 2001, and provisional application No. 60/358,895, filed on Feb. 21, 2002.

(51) Int. Cl.[7] .......................... G06F 19/00; G06F 11/30
(52) U.S. Cl. .......................... 702/181; 702/34; 702/48; 702/54; 702/183
(58) Field of Search .............................. 702/39–40, 41, 702/44, 181, 33–35, 42, 48, 54, 94, 103–104, 183; 318/114, 721, 798; 417/352, 362

(56) References Cited

U.S. PATENT DOCUMENTS

| 4,442,494 | A | | 4/1984 | Fromson et al. |
|---|---|---|---|---|
| 4,839,830 | A | * | 6/1989 | Amey et al. ................. 702/42 |
| 5,235,524 | A | | 8/1993 | Barkhoudarian |
| 5,293,040 | A | | 3/1994 | Watanabe et al. |
| 5,318,136 | A | | 6/1994 | Rowsell et al. |
| 5,365,787 | A | | 11/1994 | Page et al. |
| 5,614,676 | A | | 3/1997 | Dutt et al. |

(List continued on next page.)

FOREIGN PATENT DOCUMENTS

| EP | 0 612 039 | 8/1994 |
|---|---|---|
| EP | 0 626 697 | 11/1994 |
| EP | 0 969 274 | 5/2000 |
| WO | WO 97/38292 | 10/1997 |
| WO | WO 99/60351 | 11/1999 |
| WO | WO 01/01213 | 4/2001 |
| WO | WO 01/44769 | 6/2001 |

OTHER PUBLICATIONS

Jarrell and Bond, "A stressor based approach to equipment prognostics", May 5, 2002, pacific Northwest National Laboratory, pp. 5–8. NOTED: (This reference is in the record).*

(List continued on next page.)

Primary Examiner—Bryan Bui
(74) Attorney, Agent, or Firm—Klarquist Sparkman, LLP

(57) ABSTRACT

Methods and systems for identifying, understanding, and predicting the degradation and failure of mechanical systems are disclosed. The methods include measuring and quantifying stressors that are responsible for the activation of degradation mechanisms in the machine component of interest. The intensity of the stressor may be correlated with the rate of physical degradation according to some determinable function such that a derivative relationship exists between the machine performance, degradation, and the underlying stressor. The derivative relationship may be used to make diagnostic and prognostic calculations concerning the performance and projected life of the machine. These calculations may be performed in real time to allow the machine operator to quickly adjust the operational parameters of the machinery in order to help minimize or eliminate the effects of the degradation mechanism, thereby prolonging the life of the machine. Various systems implementing the methods are also disclosed.

46 Claims, 14 Drawing Sheets

U.S. PATENT DOCUMENTS

| | | | |
|---|---|---|---|
| 5,864,183 A | 1/1999 | Fisher, Jr. et al. | |
| 6,158,286 A | 12/2000 | Nguyen et al. | |
| 6,169,931 B1 | 1/2001 | Runnels | |
| 6,206,646 B1 | 3/2001 | Bucher | |
| 6,351,713 B1 * | 2/2002 | Board et al. | 702/42 |

OTHER PUBLICATIONS

"Annex to Form PCT/ISA/206, Communication Relating to the Results of the Partial International Search," from European Patent Office, mailed Apr. 2, 2003.

Bond, "Predictive Engineering for Aging Infrastructure," SPIE, 3588, pp. 2–13 (1999).

DeGaspari, "Keeping the Flow in Nuclear Plants," Mechanical Engineering. pp. 1–7 (May 2001).

Eisenmann and Eisenmann Jr., "Machinery Malfunction Diagnosis and Correction," Prentice–Hall, Inc., Saddle River, New Jersey pp. 243–252, 278–284, 294–343, 416–432, 435–440, and 535–545 (1998).

Greitzer et al., "Developments of a Framework for Predicting Life of Mechanical Systems: Life Extension Analysis and Prognostics (LEAP)," SOLE 1999 Symposium, Las Vegas, Nevada, pp. 1–7 (1999).

Holroyd, "The Acoustic Emission & Ultrasonic Handbook," pp. 3–63, Coxmoore Publishing Company, Oxford, England (2000).

Jarrell et al., "Nuclear Plant Service Water Aging Degradation Assessment," NUREG/CR–5379, vol. I, PNL–6560 (Jun. 1989).

Jarrell et al., "Nuclear Plant Service Water Aging Degradation Assessment," NUREG/CR–5379, vol. II, PNL–7916 (Oct. 1992).

Jarrell et al., "Prognostics and Condition Based Maintenance (CBM)—A Scientific Crystal Ball," 2002 International Congress on Advanced Nuclear Power Plants (ICAPP), paper #1194 (Jun. 2002).

Jarrell et al., "Stressor–Based Prognostics for Next Generation Systems," Tenth International Conference on Nuclear Engineering (ICONE10), paper #22458 (Apr. 2002).

Jarrell and Bond, "A Stressor Based Approach to Equipment Prognostics," Maintenance and Reliability Conference 2002 (MARCON) (May 2002).

Luft, "Measuring the 'Thermal' Movement of a Propane Refrigeration Compressor," Telediagnosis.com, 2 pages (Mar. 2002).

Perry, "Alignment Monitoring and Correction of a Turbine Driven Feed Water Pump," Energy Publications, 4 pages (Feb. 2001).

Piotrowski, "Shaft Alignment Handbook," pp. 1–13, 137–50, 189–94, 252–72, 277–97, 331–46, 376–84, 507–53, Marcel Dekker, Inc. New York (1995).

Quinn, "From Preventive to Condition–Based Maintenance," Pollution Engineering, pp. 1–3 (Aug., 2002).

Subudhi, "Nuclear Plant Aging Research (NPAR): Summary of Results and Their Uses," TR–3270–1/95, Brookhaven National Laboratory, Brookhaven, New York (1995).

"Erosion by Cavitation or Impingement," ASTM Special Technical Publication No. 408, Atlantic City Symposium Proceedings (1966).

"Online Intelligent Self–Diagnostic Monitoring for Next Generation Nuclear Power Plants," Nuclear Energy Research Initiative (NERI) Program, DE–FG03–99SF0491, FY 2002 NERI Annual Report Input.

"Process Cost Reduction Through Proactive Operations and Maintenance," State–of–the–Art Report—Food Manufacturing Coalition for Innovation and Technology Transfer, pp. 1–11 (1997).

FlexiForce®: Single Button Force Sensors, ELF™, Economical Load and Force System (introduction material and FAQ) available at http://www.tekscan.com/flexiforce/flexiforce.html) accessed on Nov. 21, 2002).

Ludeca: Permalign® Laser Monitoring System (introduction material and slide show), 33 pages (available at http://www.ludeca.com/permalign.htm) (accessed on Dec. 19, 2002).

G.D. Neil, "Detection of incipient cavitation in pumps using acoustic emission," Proc. Instn. Mech. Engrs., 211:267–277 (1997).

Jarrell and Bond, "Equipment Operation Without Failures for Fourth Generation U.S. Reactors," SPIE O03/3 (2001).

Jarrell and Blackburn, "Stressor–Based Prognostics for the Next Nuclear Generation: The Self–Diagnostic Monitoring System," Tenth International Conference on Nuclear Engineering (ICONE10), Power Point Presentation, 51 pages (Apr. 2002).

* cited by examiner

FIG. 7
Motor -- Outboard
Motor -- Inboard
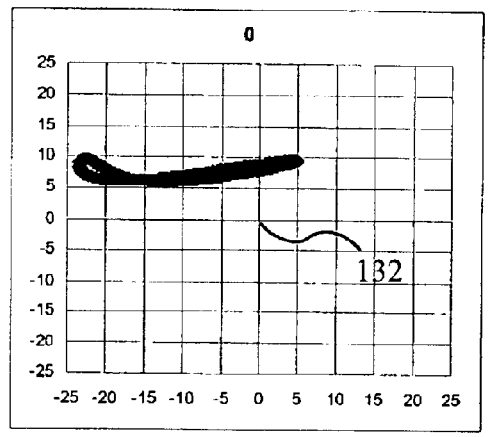
130
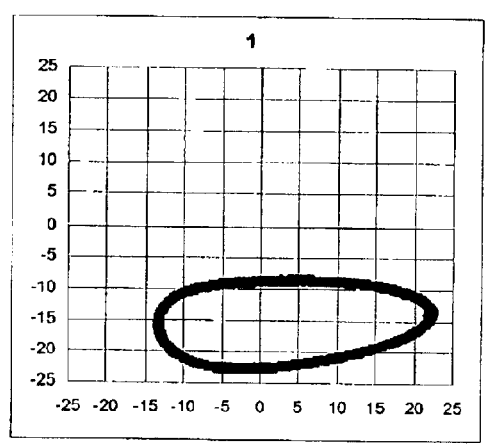
134
Pump
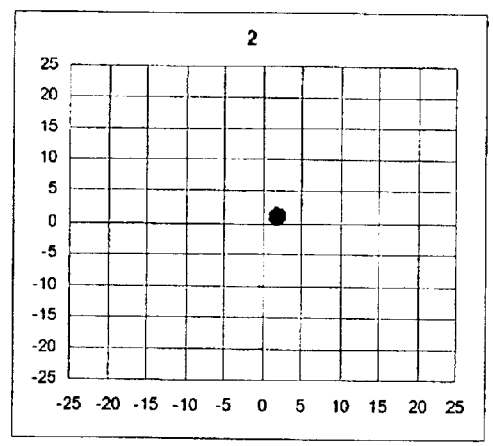
136

FIG. 12
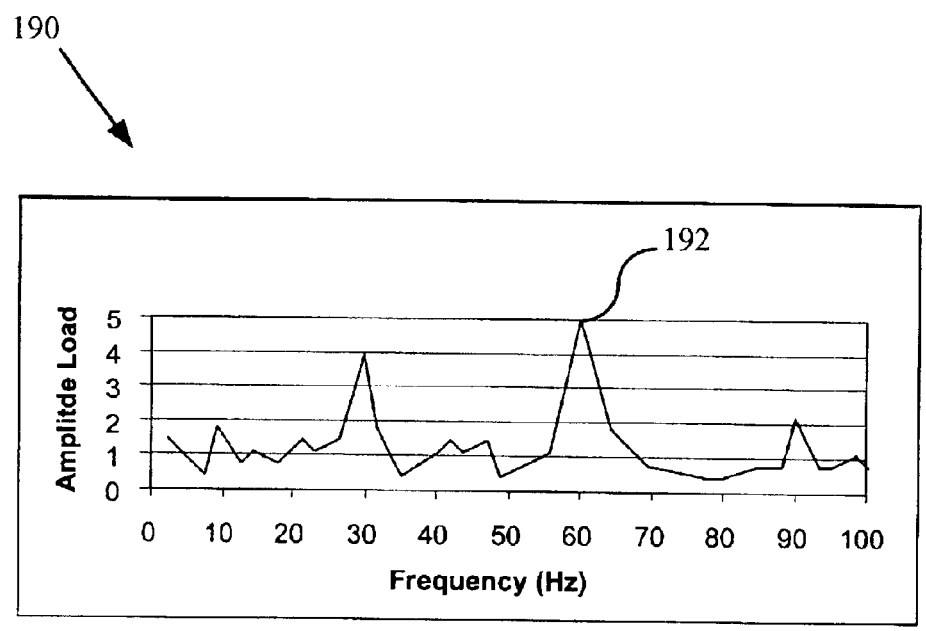
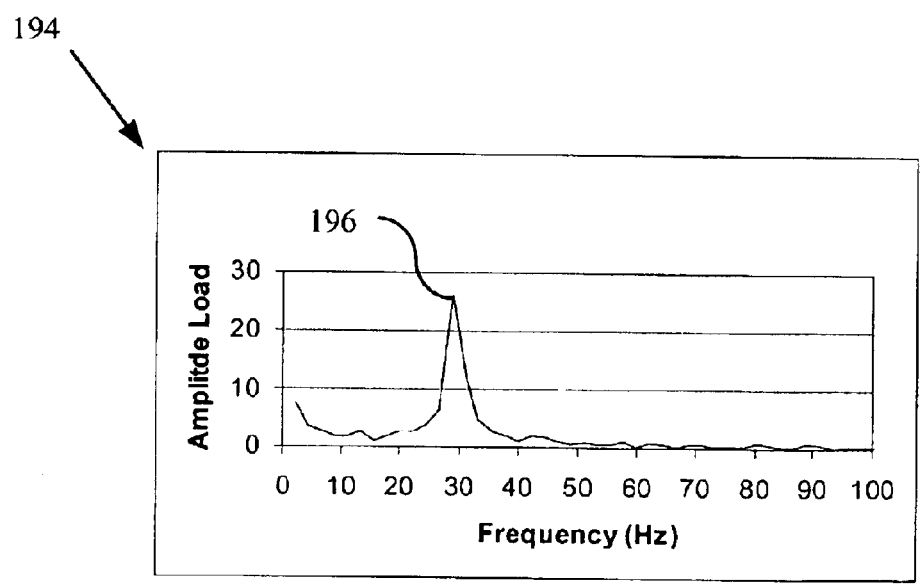

METHODS AND SYSTEMS FOR ANALYZING THE DEGRADATION AND FAILURE OF MECHANICAL SYSTEMS

CROSS REFERENCE TO RELATED APPLICATIONS

This application claims the benefit of provisional patent application No. 60/339,042 filed on Dec. 7, 2001, and provisional patent application No. 60/358,895 filed on Feb. 21, 2002.

STATEMENT OF GOVERNMENT SUPPORT

This invention was made with Government support under Contract DE-AC0676RLO1830 awarded by the U.S. Department of Energy. The Government has certain rights in the invention.

FIELD

This application relates to machine diagnostics and prognostics.

BACKGROUND

Machine failure has been a major concern of industrial operators for well over a century. Machine failure typically results from a degradation mechanism inherent in the operation of the machine (e.g., vibration, erosion, corrosion, cavitation, etc.). Ultimately, this degradation mechanism causes the machine to fail, thereby requiring replacement or repair of the machine or its components. Because machine repair often creates significant economic losses (in terms of both actual repair costs and lost operating time), machine operators desire to minimize the frequency at which machine components fail while also minimizing the cost of operation. To minimize the operation and maintenance costs, a number of different maintenance regimes may be employed.

A first, and most basic, maintenance regime is corrective maintenance. Corrective maintenance involves running a piece of machinery until it fails. Therefore, corrective maintenance is reactive in nature, and little, if any, attention is paid to ensuring that the operating conditions are within the design envelope. Consequently, the life span of the equipment is typically below the estimates of the manufacturer. Corrective maintenance requires little forethought and uses the least amount of resources from the operating and maintenance crew, at least until the machinery fails. There are numerous examples of how equipment is destroyed by rapidly acting degradation mechanisms. For example, erosion or cavitation in a pump can shorten the life expectancy of the pump by an order of magnitude or more. In very simple, non-critical components (e.g., a light bulb), the corrective-maintenance regime may be a cost-effective regime for maintaining equipment. As long as the consequence of equipment failure is not high, this approach has merit. However, in critical applications, such as the safety systems of a nuclear power plant, this risky approach is not tolerable.

FIG. 1A illustrates the prior art corrective-maintenance regime and the other prior art maintenance schemes discussed herein. The operational lifetime of a centrifugal pump is used to illustrate the various regimes. In FIG. 1A, a new pump 10 is put into service and is run until it fails at time period 12. At time period 14, a degradation mechanism 16, which had been active since the installation of the pump, begins to become noticeable by its effects on the performance of the pump 10. Because the corrective-maintenance regime involves running the machinery until failure, the time period 18 associated with corrective maintenance does not begin until after failure of the pump. By way of example, the lifetime of a centrifugal pump operating under this regime may be about six months.

A second maintenance regime is preventive maintenance. Preventive maintenance involves periodically checking the performance and material condition of a piece of equipment to determine if the operating conditions and resulting degradation rate are within the expected limits. If the degradation is outside the expected limits, the source of the degradation must be found so that it can be corrected, or at least mitigated, before the machine fails. Preventive testing, inspecting, servicing, and part replacing are done on a service-life (e.g., hours of operation) or time-in-service basis. Although accurate failure statistics can allow the testing interval to be optimized, the preventive-maintenance method is expensive, and catastrophic failures may still occur. Moreover, the preventive-maintenance method is very labor intensive and risky. Unnecessary maintenance is often performed, and incidental damage to equipment may occur as a result of poor maintenance practices. Nonetheless, a preventive-maintenance regime may be a cost-effective strategy when the life span of the equipment is well understood and consistent. For example, an air filter in constant use tends to need replacing with a fairly constant frequency.

In FIG. 1A (prior art), the time period when the pump is maintained under the preventive-maintenance regime is the time period 20, which begins when noticeable degradation of the pump occurs. Typically, there are several regular intervals during this time period when the pump is serviced. In comparison with the six-month pump lifetime associated with the corrective maintenance regime, the lifetime of a centrifugal pump operating under the preventive-maintenance regime would be expected to exceed twenty-four months.

A third maintenance regime is predictive maintenance. Predictive maintenance involves taking measurements targeted at the early detection of degradation mechanisms, thereby allowing the resulting degradation to be understood and eliminated or controlled prior to the physical deterioration of the equipment. Many nonintrusive measurement methods are known that allow for the early detection of machine degradation. For instance, vibration analysis, oil analysis, thermography, and ultrasonic analysis may be used to detect the early signs of degradation. The root cause for the degradation can sometimes be identified from these measurements, allowing mitigation efforts to be better targeted.

In FIG. 1A (prior art), the time period when the pump is maintained under the predictive-maintenance regime is the time period 22, which begins before noticeable degradation of the pump occurs because of the ability of the diagnostic systems to detect and predict the onset of the degradation mechanism. However, analysis of the captured data is not simultaneous with its measurement, thereby resulting in a delay between the onset of a stressor condition causing degradation and its mitigation. Accordingly, the time period 22 illustrated in FIG. 1A does not begin immediately upon the activation or onset of pump stressors beyond the design basis. In contrast to the twenty-four-month pump lifetime associated with the preventive-maintenance regime, the lifetime of a centrifugal pump operating under the predictive-maintenance regime would be expected to exceed forty-eight months.

The cornerstone of the predictive-maintenance regime is the accurate measurement of the performance and/or degradation of machinery so that early symptoms of degradation can be detected and corrected. For instance, the most common procedure used in the predictive maintenance regime involves trending an index or parameter that relates to the performance of the equipment. For instance, for a pump, the performance parameter may be the fluid pressure produced at the output of the pump. FIG. 2 (a prior art illustration) shows a performance parameter 30 that starts to decline from its normal operating band (NOB), reaches an alert level, and is subsequently analyzed to try and understand a reasonable projection for residual life. Failure is defined as the point 32 at which the equipment no longer is capable of supporting the function for which it was designed. Associated with this method is a large cone of uncertainty that is created by extending the maximum slope 34 and minimum slope 36 of the predicted trend of the performance parameter. This uncertainty results from inherent uncertainties in the mathematical model used to calculate the predicted trend.

As noted, the known predictive maintenance techniques involve analyzing the collected data at a time after the measurements are made. In some cases, such as the analysis of oil, the time between taking the sample and obtaining the results of the analysis may be significant. Further, as illustrated in FIG. 2, the degree of uncertainty associated with current predictive-maintenance techniques is quite large. Accordingly, even though predictive maintenance has several advantages over the other maintenance regimes, it is still not optimal.

SUMMARY

Methods and systems for analyzing the degradation and failure of mechanical systems are provided. In general, the methods and systems focus on measuring and quantifying stressors that are responsible for the activation of degradation mechanisms in the machine component of interest. The intensity of the stressor may be correlated with the rate of physical degradation according to some determinable function such that a derivative relationship exists between the machine performance, degradation, and the underlying stressor. The derivative relationship may be used to make diagnostic and prognostic calculations concerning the performance and projected life of the machine. These calculations may be performed in real time to allow the machine operator to quickly adjust the operational parameters of the machinery to minimize or eliminate the effects of the degradation mechanism, thereby maximizing the life of the machine.

According to one aspect of the disclosed technology, a method is provided for operating machinery. A degradation mechanism affecting performance of the machine and a stressor related to the degradation mechanism are identified. A stressor intensity is measured at multiple time intervals. A rate at which the degradation mechanism affects the performance of the machine is represented as a function of the stressor intensity. Using this representation of the degradation rate as a function of the stressor intensity, the predicted performance of the machine is calculated.

In another aspect, the stressor intensity is represented as a function of time. From this representation of the stressor intensity as a function of time, a precursive indicator of the degradation mechanism is calculated. For instance, the precursive indicator may be the slope of the stressor intensity (i.e., the first derivative of the function defining the stressor intensity) or the rate of change in the slope of the stressor (i.e., the second derivative of the function defining the stressor intensity). The precursive indicator(s) may be reported to the operator or used to narrow the uncertainty of the predicted performance. Adjustments to the operational parameters of the machinery can be made based on the precursive indicators.

A number of representative systems implementing the representative methods summarized above are also disclosed. In a first embodiment, for instance, a dynamic laser alignment system is utilized in machinery whose performance is affected by vibration. The dynamic laser alignment system may be used to measure the degree of pump-motor misalignment and/or the intensity of the resultant vibration at a predetermined sampling rate. The collected data may be analyzed by a computer-based analysis system according, for example, to the methods summarized above. The collected data may be substantially continuously analyzed during the operation of the machine (i.e., in real time) such that accurate diagnostics and prognostics can be immediately calculated. Accordingly, the effect of adjustments to the operational parameters of the machinery can also be evaluated in real time.

In a second embodiment, a system of load cells is used to measure the vibrational forces exerted in a rotating machine system. The data collected by the load cell system may similarly be analyzed in real time (e.g., by a computer-based analysis system) to optimize performance of the machine system.

In a third embodiment, a system of acoustic emission sensors is utilized to measure and quantify cavitation in a pump. Again, the data collected by the acoustic emission sensors can be analyzed in real time (e.g., by a computer-based analysis system) to optimize performance of the pump.

BRIEF DESCRIPTION OF THE DRAWINGS

FIG. 7 is a set of data obtained using an embodiment of the dynamic laser alignment system showing a time trace of the physical displacements of the pump and motor due to improper alignment of the motor relative to the pump.

FIG. 12 is a set of data obtained using an embodiment of a load cell system.

DETAILED DESCRIPTION

Condition-based maintenance predicts the effects of degradation by accurate identification and measurement of the root causes of the degradation. More specifically, condition-based maintenance attempts to predict the behavior of machine components and structures based on the measurement of precursive stressors. By determining the relationship between stressor intensity levels and degradation, the certainty with which machine performance is predicted is greatly increased.

Condition-based maintenance is improved by the accurate identification of a correlation between a stressor intensity level and resulting physical degradation. It has been found that for a given degradation mechanism, there exists a derivative relationship between the performance of the machine, the degradation rate, and the underlying stressor set. By understanding and exploiting this degradation-specific correlation, it is possible to make accurate physics-based diagnostic and prognostic determinations.

Figure 1A:
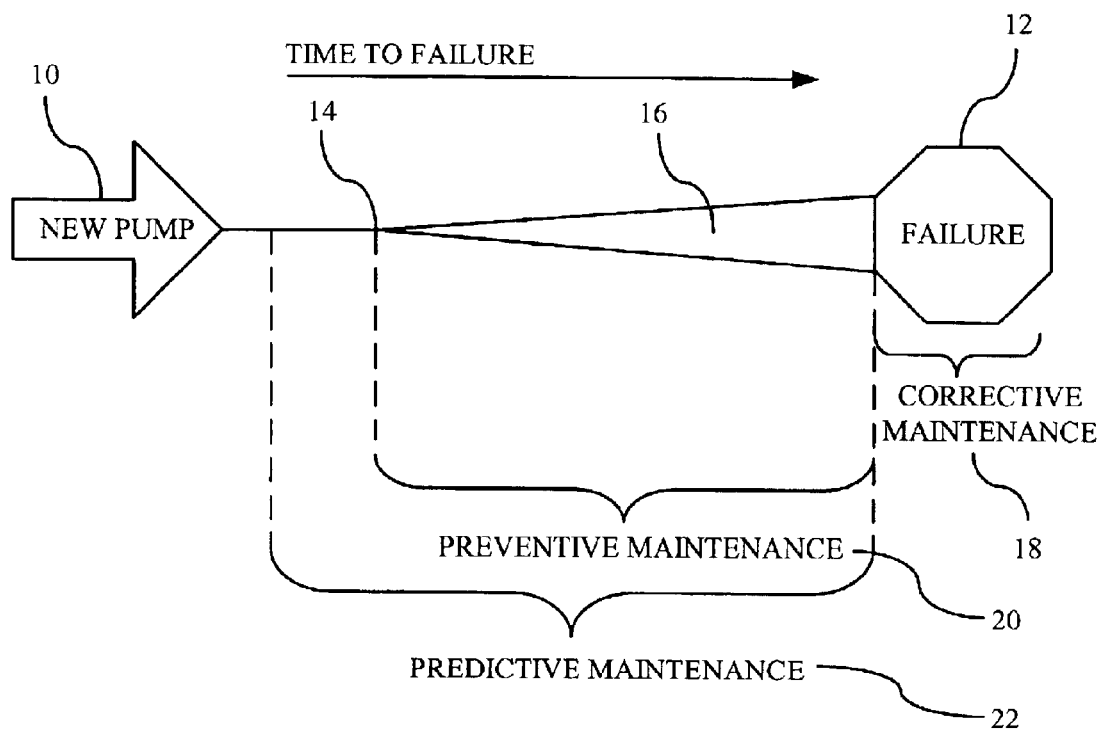
FIG. 1A is a block diagram illustrating the various prior art machine maintenance regimes.
Figure 1B:
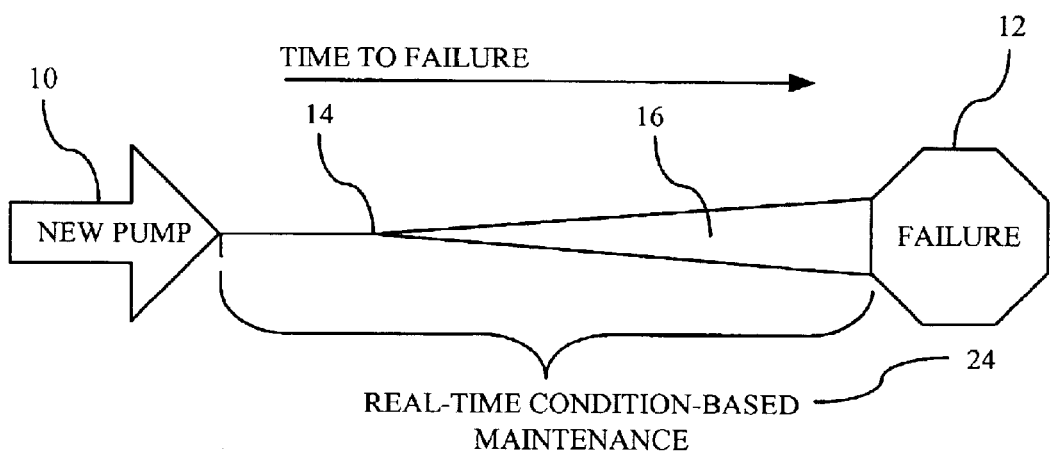
FIG. 1B is a block diagram illustrating the real-time condition-based maintenance regime.

Certain embodiments of the disclosed condition-based maintenance methods may be performed in real time (i.e., during the operation of the subject machinery) such that changes in the degradation mechanism can be quickly or substantially instantaneously detected and a solution identified. Moreover, by substantially continuously monitoring the machinery in real time, the effectiveness of corrective measures can be quickly ascertained and evaluated for an operator. As shown in FIG. 1B, the time period associated with real-time condition-based maintenance is time period 24, which begins immediately upon the activation of the monitored machinery. In contrast to the twenty-four month pump lifetime associated with the predictive maintenance regime, the lifetime of a centrifugal pump operating under the real-time condition-based maintenance regime may be substantially prolonged. For example, the pump life may be extended to around 240 months or longer.

General Methodology

Degradation mechanisms and the associated decrease in machine performance start with the application of a stressor to a machine component. Stressors are a necessary part of the life of a machine component. A design engineer sets the desired stressor intensity level so the degradation in the physical state of the component happens slowly enough for the equipment to last for a specified design life. In general, when the design limit of a stressor is exceeded, the component life expectancy starts to shorten to less than the projected design duration. Conversely, careful control of operational parameters can result in the opposite effect—extending the component life beyond that normally expected for the design. Therefore, by measuring stressor intensity levels and analyzing them during actual operation of the machine (i.e., in real time), the root cause of a degradation mechanism can be immediately identified and the operational parameters of the machine adjusted so as to slow and/or prevent further degradation, thereby extending the operational life of the machinery.

Figure 2:
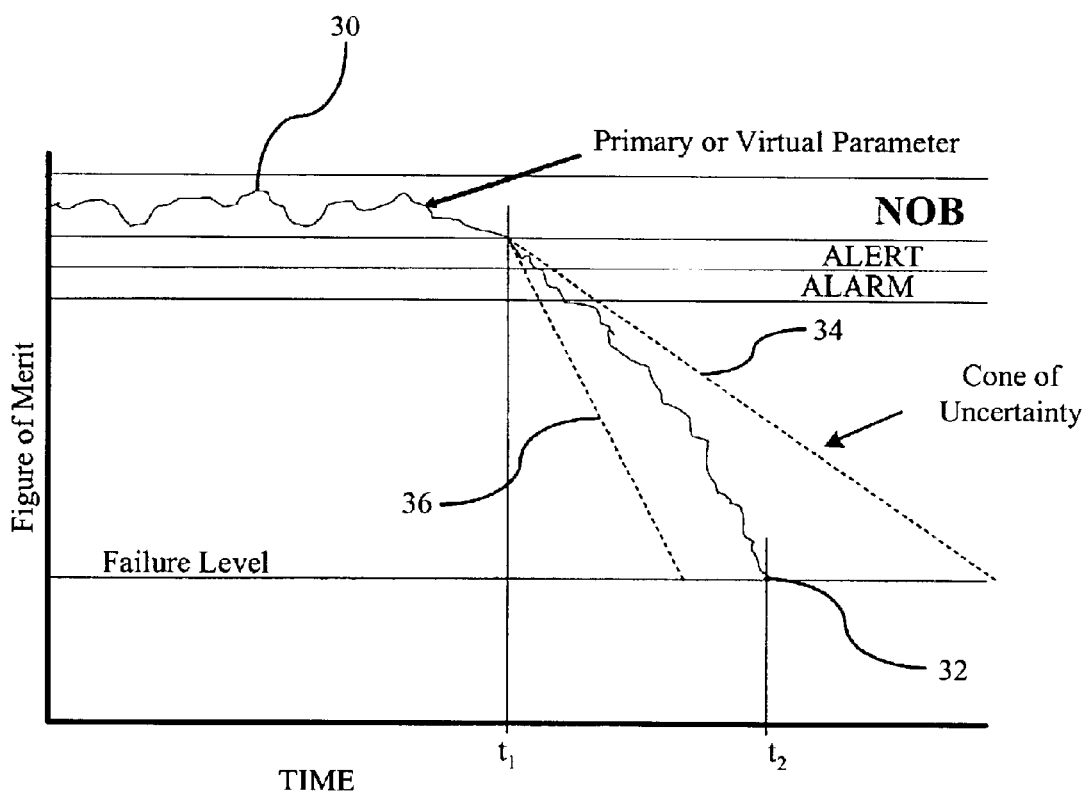
FIG. 2 is a graph showing a predicted machine life using the prior art predictive-maintenance regime.
Figure 3:
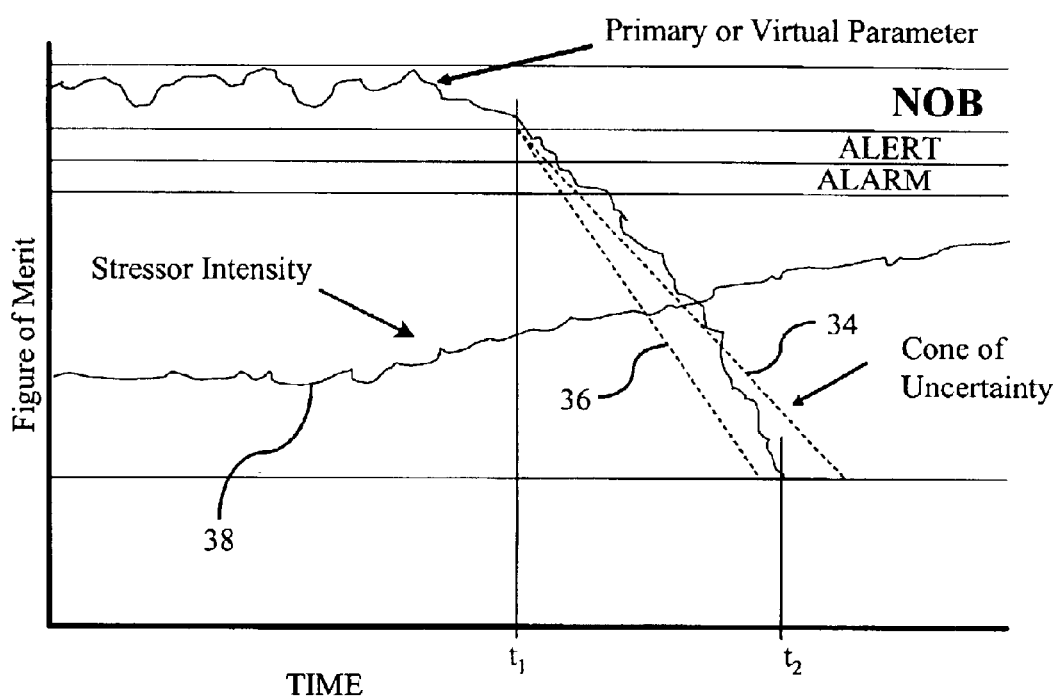
FIG. 3 is a graph showing a predicted machine life using an embodiment of the real-time condition-based maintenance regime.

By focusing on trending a stressor's characteristics, a precursive relationship can be derived to provide an accurate projection of the remaining useful life of the machine or machine component. FIG. 3 shows the expected result in narrowing the uncertainty of the predicted machine life by focusing on the stressor. As shown in FIG. 3, by accurately measuring and trending the stressor 38, the cone of uncertainty between the maximum slope 34 and the minimum slope 36 that defines the expected performance of the machinery can be narrowed substantially in comparison to the cone of uncertainty shown in FIG. 2.

The basis for the precursive relationship between stressor intensity and performance is as follows: the slope of the trended performance parameter gives a measure of the degradation rate of the performance. The performance degradation rate may be assumed to be a function of the rate of decline in the physical characteristics of the equipment. Experience from predictive-maintenance measurements has shown this assumption to be true if one accounts for the nonlinearity between physical attributes and their effects on performance. This relationship may be represented as follows:

$$\frac{dP}{dt} = \text{performance degradation rate} \propto \text{physical degradation rate} \quad (1)$$

where P is the primary or virtual performance parameter.

Because the stressor intensity is responsible for the rate of physical degradation, and hence performance degradation, the physical degradation rate DR can be equated to the stressor intensity S by a function Fn as follows:

$$\frac{dP}{dt} = DR(P) = Fn(S). \quad (2)$$

Figure 4:
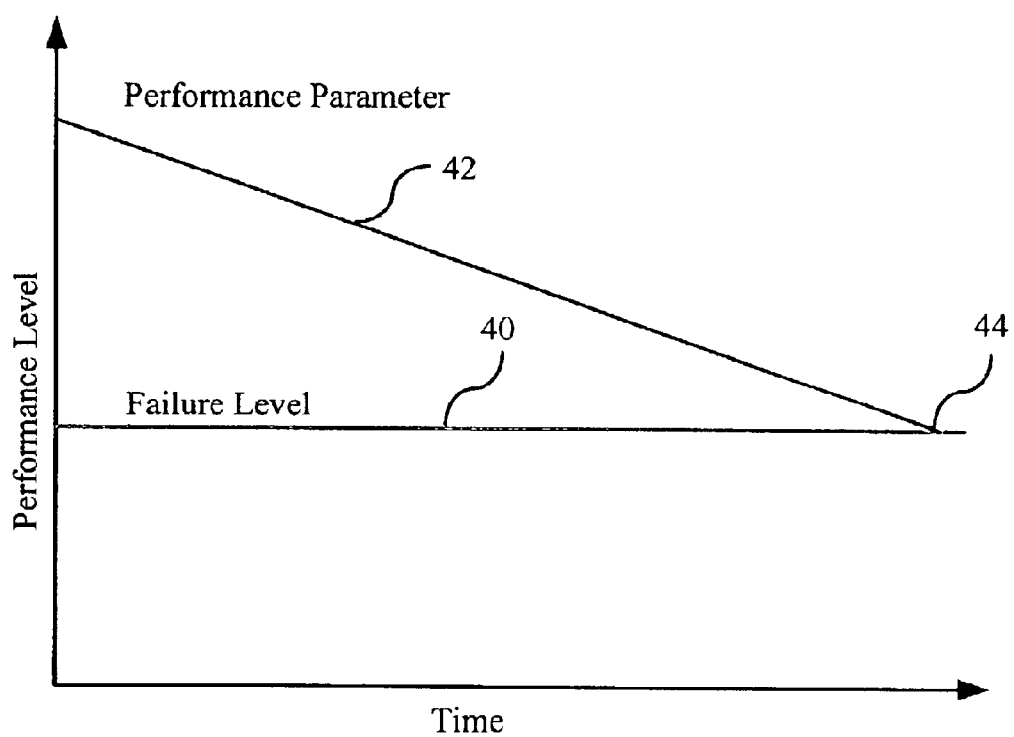
FIG. 4 is a graph illustrating correlation between the design stressor intensity and the expected degradation rate.

In other words, the instantaneous degradation rate, which can be used to inform the operator of how quickly a degradation situation is deteriorating or improving, can be correlated to the stressor intensity by a functional relationship Fn. This relationship is exemplified in FIG. 4. In FIG. 4, the existence of a constant stressor intensity is assumed. The performance parameter P is shown as decreasing at a constant rate over time until it reaches a level 40 at which the machine fails, termed the failure level, at time 44. In FIG. 4, the stressor intensity is idealized in that it is constant over time, thereby resulting in a constant slope of the line 42 defining the performance parameter over time. The slope of line 42 is the degradation rate $$\frac{dP}{dt}$$

and directly correlates to the stressor intensity S according to some identifiable function Fn.

The stressor intensity S provides a direct indicator of compliance or noncompliance with the design basis of the equipment. Moreover, the stressor intensity S typically varies over time such that it is definable as a function of time t. Accordingly, the time derivative of equation (2) may be calculated in order to obtain the following relationship:

$$\frac{d^2P}{dt^2} = \frac{dDR}{dt} = \frac{dS}{dt} \quad (3)$$

where $$\frac{dS}{dt}$$

is the stressor trend or stressor slope. Therefore, by following the slope of the stressor intensity, one can obtain a precursive measure of the rate of change in the physical degradation rate. Moreover, the stressor slope can be used to predict and to refine the time path of the performance parameter P.

The rate of change in the slope of the stressor gives yet another precursive dimension for narrowing the uncertainty of the predicted performance path. This stressor gradient is among the most sensitive, or root-precursive, indicators as to whether the stressor level will increase or decrease under current operating conditions:

$$\frac{d^2S}{dt^2} = \text{root indicator} \qquad (4)$$

Accordingly, there exists a complete mathematical description of the stressor's derivative chain—its level, slope, and gradient—which may be used to effectively diagnose the current operating condition of the machine. If a measure of the root indicator, or any of the precursive indicators, can be accurately determined, the mathematical description can also be used to provide an accurate physical description of the future condition and performance of the machine or machine component.

Figure 5:
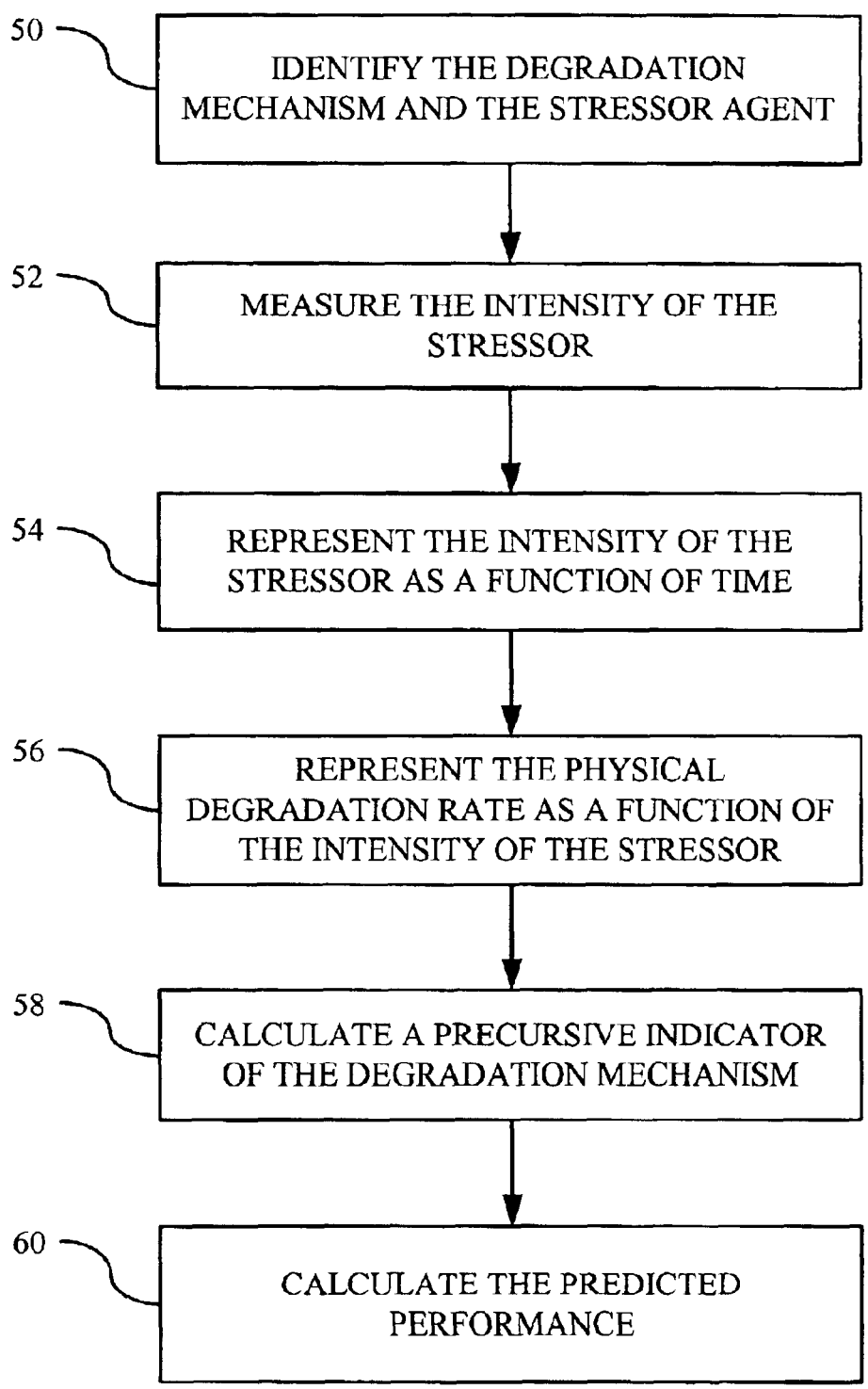
FIG. 5 is a flowchart showing a general method of measuring a stressor, calculating a precursive indicator, and predicting the performance of a machine.

FIG. 5 shows a general method of operating a machine applying the mathematical description described above. The method shown in FIG. 5 may be used to predict the future performance of the machinery and/or to provide the operator with feedback as to whether changes made to the operational parameters of the machinery are improving the machine's performance. The method may be implemented using a suitable measurement system connected to a computer-based analysis system. Effective implementation of the method can result in: (1) a marked increase in equipment life; (2) earlier mitigation or corrective actions taken; (3) decreased process downtime; (4) decreased maintenance parts and labor; (5) better product quality; (6) decreased environmental impact; and/or (7) energy savings.

At process block 50 of FIG. 5, a degradation mechanism of the machine and a stressor agent causing the degradation mechanism are identified. Although many degradation mechanisms and corresponding stressor agents are known, a particular machine may need to be analyzed using known root-cause-analysis techniques in order to identify the relevant degradation mechanisms and stressors.

At process block 52, the intensity of the stressor is measured. The stressor may be measured in any suitable manner, such as by using a measurement system specifically designed to detect and measure the stressor. There may exist a number of different systems suitable for measuring the intensity of the stressor. For example, the measurement system may measure the stressor substantially continuously at a predetermined sampling rate such that the stressor data can be analyzed during the operation of the machine.

At process block 54, the intensity of the stressor is represented as a function of time. In other words, the measurements obtained at process block 52 are analyzed to correlate the intensity of the stressor with time. This representation may be based on the measurements taken at process block 52 and may be substantially continuously updated so that changes made to the stressor intensity are quickly taken into account.

At process block 56, the physical degradation rate of the machinery is represented as a function of the intensity of the stressor. In other words, a function Fn that correlates the degradation rate to the stressor intensity is determined. This correlation may be found through a variety of means. For instance, a first baseline measurement of the machinery may be obtained (e.g., a measurement of the thickness of a pump wall subjected to cavitation). The degradation mechanism may be applied at a fixed stressor intensity over a fixed period of time. A second measurement of the machinery may be obtained. The two measurements may be compared in order to determine the amount or degree of physical degradation occurring over time. The degradation rate (e.g., the metal removal rate of a pump wall) can be represented as a function of the stressor intensity. Any number of measurements may be taken in order to calculate and refine the representation. The function Fn may also be obtained by combining empirical data with known degradation equations.

At process block 58, a precursive indicator of the degradation mechanism is calculated using the representation of process block 54, which provides the intensity of the stressor as a function of time. The precursive indicator may be calculated, for example, according to the derivative chain described above. For instance, a first precursive indicator is the slope of the stressor intensity and may be found by, e.g., calculating the first derivative of the function defining the time history of the stressor intensity. A second precursive indicator, the root indicator, is the rate of change in the slope of the stressor and may be found by, e.g., calculating the second derivative of the function defining the stressor intensity. The precursive indicator calculated at process block 58 may comprise either or both these precursive indicators and may be calculated substantially continuously during the operation of the machinery. Further, the precursive indicator (s) calculated at process block 58 may be reported (e.g., through a display) to the operator in real time so that the operator can ascertain whether changes made to the operational parameters of the machinery are improving or aggravating the stressor intensity, and hence the performance of the machinery. For instance, the root indicator (i.e., the second derivative of the function defining the stressor intensity) may be displayed as either a positive or negative value, thereby indicating that the rate of change in the stressor intensity is positive or negative.

At process block 60, the predicted performance of the machinery is calculated. The predicted performance may be calculated by, e.g., integrating the representation determined at process block 56, which provides the physical degradation rate as a function of the intensity of the stressor. The predicted performance of the machinery may also be calculated in part using the precursive indicators from process block 58. For instance, the slope or gradient of the stressor intensity may be used to narrow the uncertainty of the predicted performance. Further, the calculations made at process block 60 may be substantially continuously updated during the operation of the machine. The predicted performance can be used to calculate a remaining operating life of the machinery. This calculation can be made by using empirical knowledge concerning the amount of physical degradation that can occur before machine failure.

Although the method described above presumes only a single stressor agent contributing to a degradation mechanism, the method may be modified by one of ordinary skill in the art to account for and measure multiple stressor agents contributing to a degradation mechanism. For non-orthogonal degradation (e.g., corrosion-erosion couples), a functional relationship that accounts for any acceleration in the degradation process due to the interaction of the degradation mechanisms may have to be calculated. Similarly, the method may be modified to calculate the predicted performance of machinery affected by multiple degradation mechanisms.

Implementations of the disclosed methods are described below in connection with representative embodiments that are not intended to be limiting in any way. Although the embodiments utilize a centrifugal pump as the exemplary machine on which the general method is applied, the principles set forth herein may be utilized on any machine or machine component affected by a degradation mechanism caused by a stressor. Further, the specific instrumentation related to rotational stressors may be employed with any rotating machinery (e.g., various other types of pumps, compressors, fans, generators, etc.).

First Embodiment

One of the most predominant degradation mechanisms resulting in centrifugal pump failure is vibration. Other mechanisms and causes, however, may also lead to the failure of the pump (e.g., erosion, corrosion, etc.). One of the principal stressor agents that contribute to vibration in the centrifugal pump is the misalignment of the axial or angular plane of rotation of the driving shaft with the driven shafts or an imbalanced or axial-eccentricity condition in one of the rotating elements.

Figure 6:
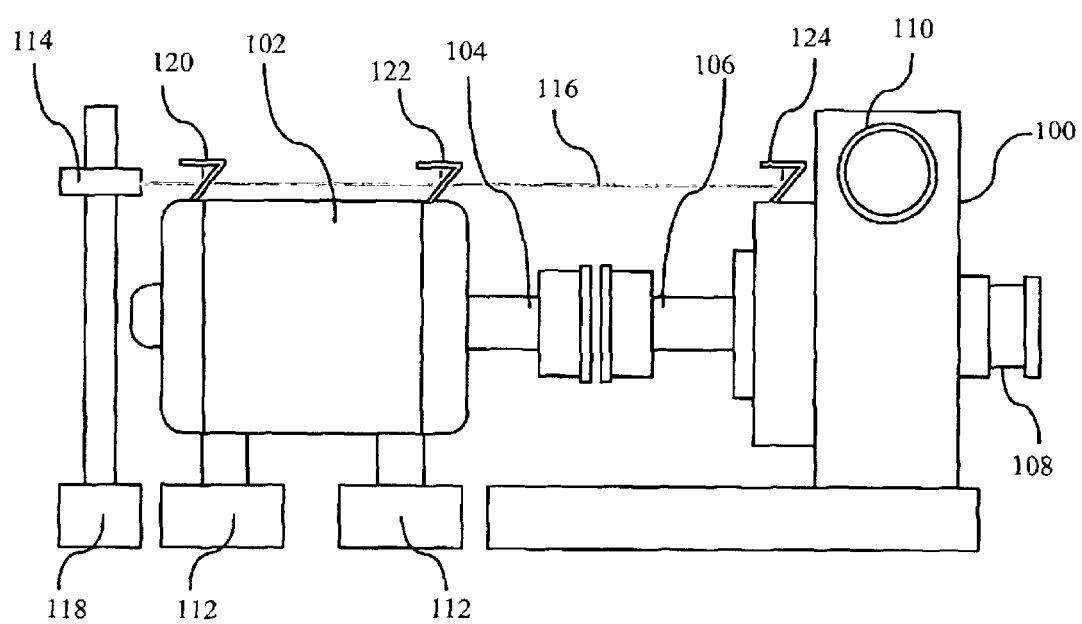
FIG. 6 is a side view schematically showing an embodiment of a pump-motor system that utilizes a dynamic laser alignment system.

FIG. 6 shows a centrifugal pump 100 utilizing a dynamic laser alignment system that may be used to measure alignment and vibration. As seen in FIG. 6, a motor 102 includes a driving shaft 104 that couples with an impeller shaft 106 of the pump 100. The impeller shaft 106 of the pump 100 is coupled to an impeller, or rotor, (not shown) whose rotating blades force liquid entering the pump at input 108 through a volute, or scroll, (not shown) to output 110. The coupling may be any type of suitable coupling, such as a gear-type coupling, disc coupling, magnetic coupling, etc. The cross-section of the volute increases as the liquid passes through it, thereby decreasing the velocity of the liquid and correspondingly increasing its pressure. The motor 102 may be positioned on a variable-position support that allows the alignment of the motor with the pump 100 to be adjusted. In FIG. 6, for example, the motor 102 is mounted on tri-axial positioning platforms 112 that allow for fine adjustments (e.g., ±0.025 mm) in axial offset or angular skew. Although any number of positioning platforms 112 may be used, the motor 102 shown in FIG. 6 is mounted on four positioning platforms. Other arrangements are also possible. For example, the pump 100 or the impeller shaft 106 may include some form of positioning device that allows for it to be adjusted with respect to the motor 102.

In this embodiment, a dynamic laser alignment system is used to measure the alignment and vibration in the pump 100 and motor 102. In FIG. 6, a laser light source 114 producing a laser beam 116 (e.g., a collimated laser beam) is positioned on an independent support 118 that is vibrationally isolated from the pump 100 and motor 102. The laser beam 116 is directed through one or more targets integrally attached to the subject machinery. In FIG. 6, for instance, three targets 120, 122, 124 are utilized—one positioned at the outboard end of the motor 102 (the outboard target 120), one positioned at the inboard end of the motor (the inboard target 122), and one positioned on the pump housing (the pump target 124). The targets may comprise detectors that are capable of substantially continuously monitoring the position of the laser beam 116 relative to a center, or null, position. The targets have a detection area large enough to measure beam deviations consistent with the largest expected displacement of the machine component (e.g., 5 cm, etc.). The targets may sample the displacement at a variety of different sampling rates. For instance, in one embodiment, the targets sample the displacement at a rate of 10 KHz. Moreover, the targets may resolve the displacement to varying degrees of accuracy. For instance, in one embodiment, the targets are accurate to ±5 microns. The targets may comprise, for instance, quadrant detectors, dual-axis lateral-effect detectors, detectors using high-frequency laser diodes, charged-couple-device (CCD) detectors, etc. Moreover, as shown in FIG. 6, a target may be equipped with optics used to split the laser beam 116 into a portion measured by the target and a portion that continues along the measurement path to the next target. This arrangement allows for the substantially simultaneous measurement of displacement by multiple targets referenced to a single stationary point. The data measured by the targets may be analyzed by computer-based analysis system.

Figure 8:
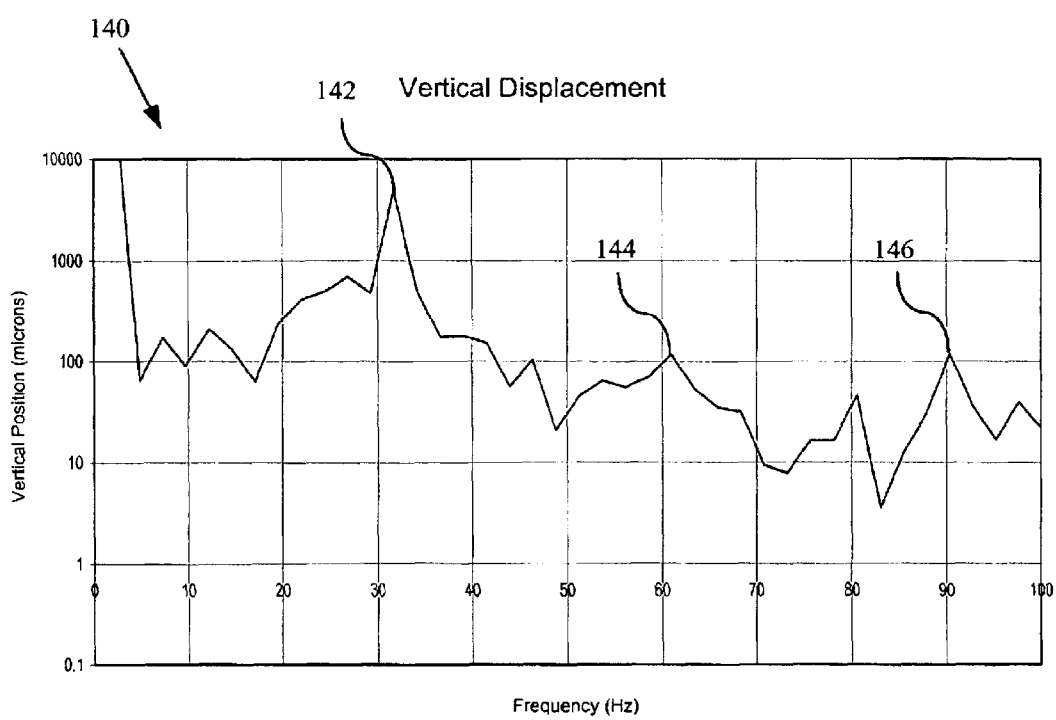
FIG. 8 is a set of data obtained using an embodiment of the dynamic laser alignment system showing fast Fourier transforms of resulting vibration of the pump-motor system.

An example of the data produced by the dynamic laser alignment system is shown in FIGS. 7 and 8. FIG. 7 shows three dynamic motion traces from each of the three targets 120, 122, 124 produced while the pump operates at some constant operating frequency. The first graph 130 shows the displacement of the target 120, which is located adjacent the outboard edge of the motor 102, relative to a zero, or null, position 132. As can be seen from the first graph 130, the outboard edge of the motor 102 exhibits significant lateral displacement at the selected operating frequency. The second graph 134 shows the displacement of the target 122, which is located adjacent the inboard edge of the motor 102. As seen in the second graph 134, the inboard edge of the motor 102 exhibits significant lateral and vertical displacement. Further, by comparing the first graph 130 with the second graph 134, the alignment of the motor with respect to the pump can be monitored and controlled. The third graph 136 shows the displacement of the target 124, which is attached to the pump 100. The third graph 136 shows that the pump does not exhibit significant vibration or displacement at the selected operating frequency. Although FIG. 7 shows one manner in which the alignment data can be displayed, other displays are possible (e.g., a 3-D time-motion display).

The data measured by the targets of the dynamic laser alignment system may also be used to measure the intensity of the vibration experienced in the pump-motor system. In one embodiment of the system, for example, the targets are accurate enough (e.g., ±5 microns) and have a high enough sampling rate (e.g., 10 KHz) to allow for the accurate measure of machine vibration intensity (e.g., up to a Nyquist frequency of approximately 5 KHz). For instance, a fast Fourier transform (FFT) may be performed on the signal such that the various frequencies at which the pump-motor system resonates can be discretely analyzed. FIG. 8, for instance, shows the associated FFT graph 140 of the pump-motor system at a constant operating speed (e.g., 1750 rpm). From the FFT graph 140, one can see that the largest amount of measured vertical vibration occurs at peak 142, which corresponds to about 30 Hz, the fundamental resonant frequency. Smaller peaks 144, 146 are experienced at the higher harmonic frequencies (60 Hz, 90 Hz, etc.).

By performing operational runs using the instrumentation described above and measuring the amount of physical degradation during the course of the run, the degradation rate (or empirically determined degradation formulation)

can be correlated with the stressor intensity, thereby allowing the prognostic methods discussed above to be utilized. The measured data can be analyzed (in real time or otherwise) by a computer-based analysis system in order to provide the operator with an accurate prediction of the residual life of the pump-motor system as a result of misalignment or unbalanced components and to provide the operator with a clear picture of whether adjustments to the operational parameters of the pump reduce or increase the intensity of the stressor. Further, because the dynamic laser alignment system can provide dynamic motion traces for measuring alignment as well as associated FFTs for measuring vibration, the dynamic laser alignment system gives the operator precise alignment control of the drive shaft 104 with the pump shaft 106.

It has been found that through the use of the system described above, the vibration experienced by the pump-motor system can be reduced by a factor of two in comparison with traditional alignment methods. The data from this system also allows for an investigation of dynamic laser alignment techniques for accurate differentiation between misalignment and rotating balance conditions. Moreover, in mechanical systems that experience a "soft foot" condition (i.e., a non-rigid base, such as the positioning platforms discussed above), constant adjustment and monitoring of the alignment minimizes the vibration experienced in the system. Traditional alignment systems are typically unable to account for the existence of "soft foot," which may require the system's alignment to be constantly adjusted.

Second Embodiment

Figure 9:
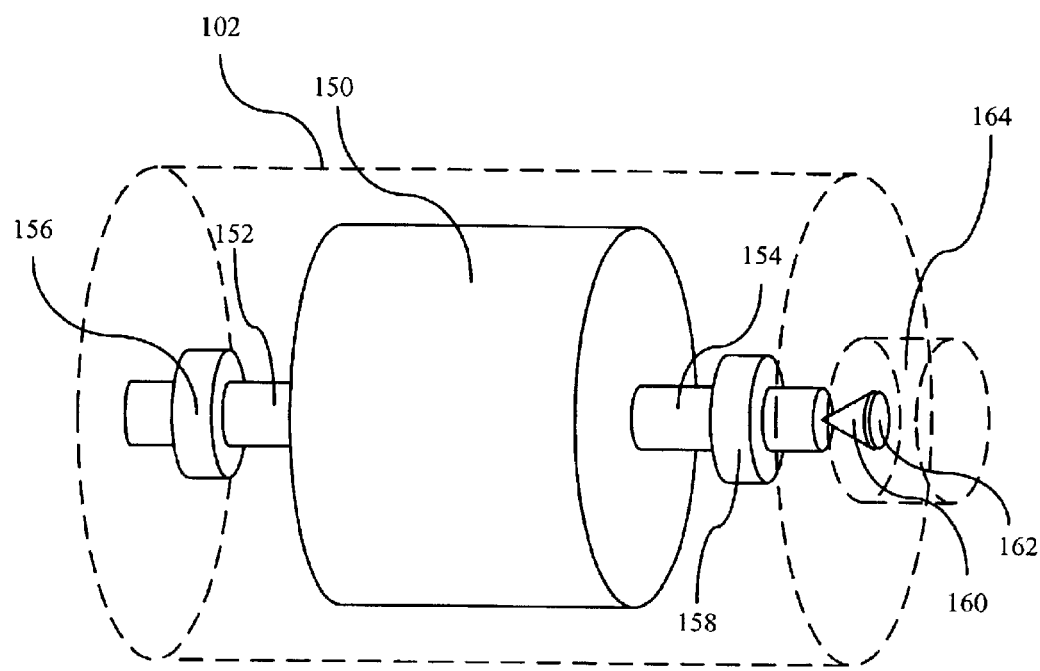
FIG. 9 is a cross-sectional view schematically showing an embodiment of a motor utilizing a load cell system.

The second representative embodiment involves quantifying the vibration of the pump-motor system by measuring the reaction forces exerted by the drive shaft 104 on the bearings of the motor 102 using a system of load cells. FIG. 9 shows one possible embodiment of the load cell system, but is not intended to be limiting in any way. Instead, a number of different load cell configurations are possible, including the use of only one set of load cells on either the inboard or outboard side of the motor 102, or the use of a set of load cells elsewhere on the rotating shafts of the pump-motor system.

FIG. 9 shows the motor 102 and its armature 150. Two motor shafts extend from the motor armature 150—an inboard motor shaft 152 and an outboard motor shaft 154. The inboard motor shaft 152 is housed and rotates within an inboard radial bearing 156. Similarly, the outboard motor shaft 154 is housed and rotates within an outboard radial bearing 158. As more fully discussed below, each of the radial bearings 156, 158 is supported by a load cell system that is used to measure the bearing load. Also shown in FIG. 9 is a housing extension 164 that may be used to house an axial load cell (not shown and discussed more fully below) that measures the axial displacement of the armature 150 during operation of the motor 102. In order to best transmit the axial force to the axial load cell, a conical axial spacer 160 and an axial thrust bearing 162 are positioned adjacent the outboard motor shaft 154. The axial load cell is positioned within the housing extension 164 and adjacent to the axial thrust bearing 162.

The load cells may comprise any suitable load cell that dynamically measures the static and dynamic load at various time intervals. In one embodiment, the load cells comprise thin, flexible load cells. For instance, the load cells may comprise FLEXIFORCE sensors manufactured by Tekscan. FLEXIFORCE load cells comprise ultra-thin (e.g., 0.012 mm) flexible printed circuits that are constructed of two layers of substrate, such as a polyester film. On each layer, a conductive material (e.g., silver) is applied, followed by a layer of pressure-sensitive ink. Adhesive is used to laminate the two layers of substrate together to form the sensor. These load cells exhibit a resistance that varies proportionally with the applied force. In the absence of load, the resistance of the sensor is very high and decreases as a load is applied.

It may be useful to amplify the signal produced by the load cells in order to optimize data acquisition. For instance, in the embodiment using FLEXIFORCE sensors, effective measurement may be achieved by biasing the load cells with a constant voltage and inputting the resulting load-dependent currents into negative feedback amplifiers, thereby converting the signals to measurable voltages. Further, before being placed in the load cell systems, the load cells may be individually exercised and calibrated. A hydraulic press may be used to aid in this process. Once calibrated and installed, the output from the load cells may be analyzed by a computer-based analysis system. The output from the load cells may be sampled at a frequency sufficient to acquire the desired information. In one embodiment, for instance, the load cells are sampled at a rate of 10 KHz. Data acquired during each sample period may be displayed substantially continuously or archived for subsequent analysis.

In one particular embodiment, the load cells are positioned around the radial bearings such that they "float" the motor armature 150. In other words, the load cells are positioned within a radial bearing housing such that few, if any, other components of the motor 102 make direct contact with the radial bearing. This allows the measurements taken by the load cells to be as accurate as possible by eliminating other sources of vibration or dampening.

Figure 10:
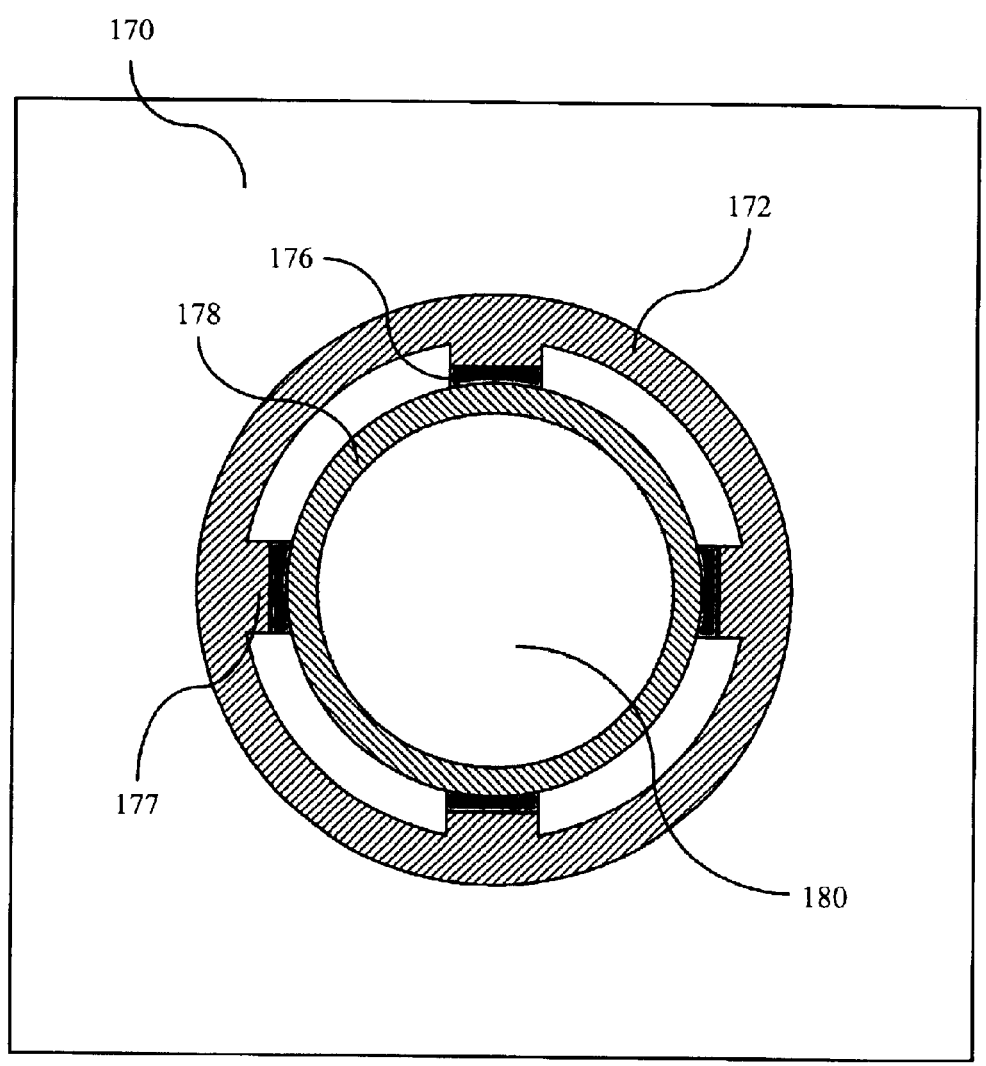
FIG. 10 is a cross-sectional view schematically showing an embodiment of a radial bearing housing having four load cells.

FIG. 10 shows one possible configuration of a bearing housing 170 and a radial bearing 180 that may be used to float the armature 150. To reduce or eliminate attenuation of induced vibration, as with epoxy attachment methods, the mounting of the load cells 176 in the bearing housing 170 shown in FIG. 10 uses no adhesives and is instead performed by frictionally supporting the bearing 180 within the bearing housing 170. In the illustrated configuration, a bearing housing 170 of the motor 102 includes a thin (e.g., 1 mm) outer shim 172. The outer shim 172 may have load pads 177 that provide a flat surface on which the load cells 176 are positioned. Although four load pads 177 are shown in FIG. 10, any number of load pads is possible. For instance, three load pads 177 may be placed at equal angles around the circumference of the shim 172. Load cells 176 are positioned on the load pads 177. An adjustment shim 178 may be positioned between the load cells 176 and the outer race of the bearing 180. The adjustment shim 178 may be relatively thin (e.g., 1 mm). The adjustment shim 178 creates a very light interference fit with the bearing 180.

Figure 11:
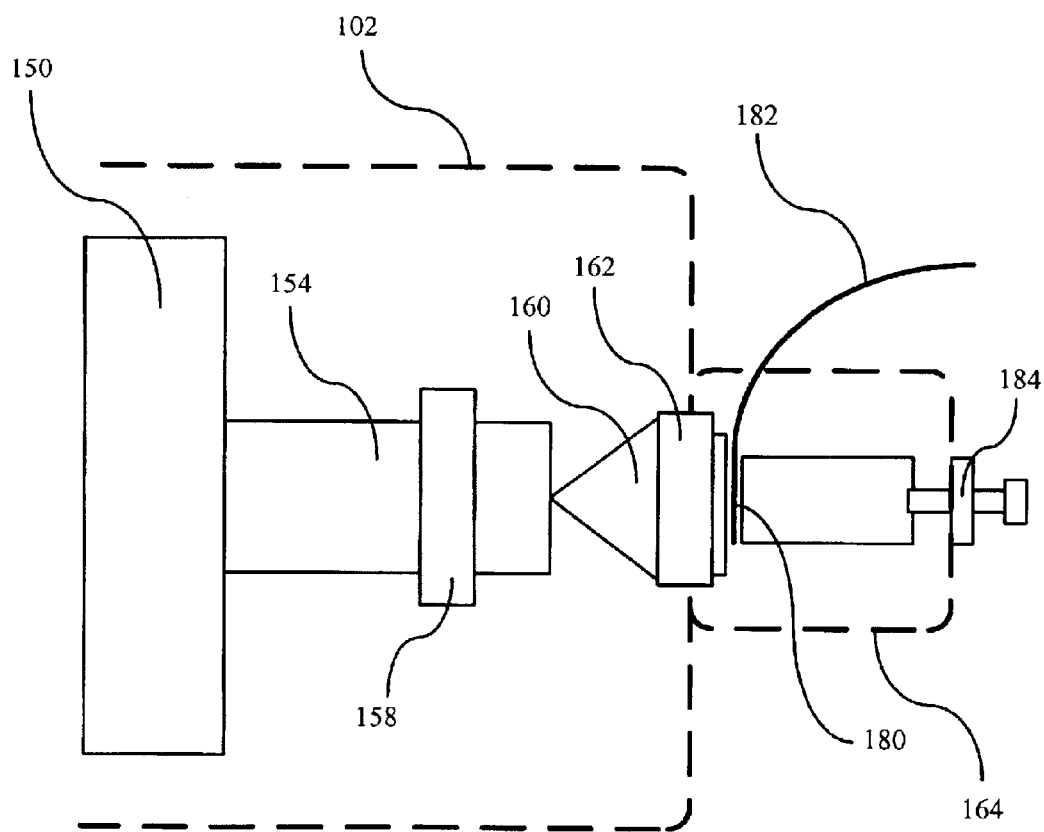
FIG. 11 is a side view schematically showing an embodiment of a motor extension housing.

FIG. 11 shows one possible configuration of the motor housing extension 164 and the axial load cell 180. As noted above, the armature 150 includes an outboard motor shaft 154 that rotates within the outboard radial bearing 158. The conical axial spacer 160 may be used to center the forces exerted by the shaft 154. The axial thrust bearing 162 may be positioned adjacent the conical axial spacer 160 in order to allow static forces to be transmitted through to an axial load cell 180. The axial load cell 180 is positioned adjacent the axial thrust bearing 162 and produces a signal that is transmitted along wire 182. The motor housing extension 164 may also be fit with an axial preload adjustment screw 184 that secures the axial load cell 180 between the axial thrust bearing 162 and the screw.

Data produced by the load cell system described above may be analyzed by a computer-based analysis system. An example of the analyzed data is shown in FIG. 12. In particular, FIG. 12 shows an FFT graph 190 of the pump-motor system at a constant operating speed (e.g., 1750 rpm). From the FFT graph 190, one can see that the largest amount of measured bearing load occurs at peak 192, which corresponds to about 60 Hz, the first harmonic of the fundamental resonant frequency 30 Hz. This result is somewhat unexpected and suggests that harmonic vibration may play a stronger role in bearing fatigue than previously thought. Graph 194 of FIG. 12 shows the FFT of the data from the axial load cell 180 taken during the same test as graph 190. As seen in graph 194, the largest amount of measured axial load occurs at peak 196, which corresponds to about 30 Hz, the fundamental resonant frequency. Other forms of displaying the data obtained by the load cells are also possible (e.g., a polar-force plot).

By performing operational runs using the instrumentation described above and measuring the amount of physical degradation during the course of the run, the degradation rate (or an empirically determined degradation formulation) can be correlated with the stressor intensity, thereby allowing the prognostic methods discussed above to be utilized. The measured data can be analyzed (in real time or otherwise) by a computer-based analysis system in order to provide the operator with an accurate prediction of the bearing residual life as a result of misalignment or unbalanced components and to provide the operator with a clear picture of whether adjustments to the operational parameters of the pump reduce or increase the intensity of the stressor.

For instance, a directly derived correlation between angular misalignment and the reduction in bearing life can be determined by utilizing the discrete FFT signature produced by the load cell system described above. In particular, a well-known life factor equation of the form:

$$LF = \left(\frac{P_{ei}}{P_{ea}}\right)^p \quad (5)$$

was used to derive the stressor to life reduction factor of $$LF = 1 - (0.02) \times (\text{angular offset}) \quad (6)$$

where LF is the life reduction factor, $P_{ei}$ is the ideal aligned equivalent load, $P_{ea}$ is misalignment equivalent load, p is the load life exponent, and angular offset is specified in mils of base displacement of the test pump. Although equations (5) and (6) are specific to the test apparatus used, they show a closed form equation relating the stressor intensity to the useful residual life of the machine.

Third Embodiment

Another one of the predominant degradation mechanisms resulting in centrifugal pump failure is cavitation. Cavitation in a centrifugal pump is recognized as a fluid state in close proximity to, or above, the working fluid saturation line (i.e., how close the fluid is in terms of temperature/pressure space to the boiling point of the liquid). The principal stressor agent that contributes to cavitation in the centrifugal pump is flow throttling and suction temperature rise.

Figure 13:
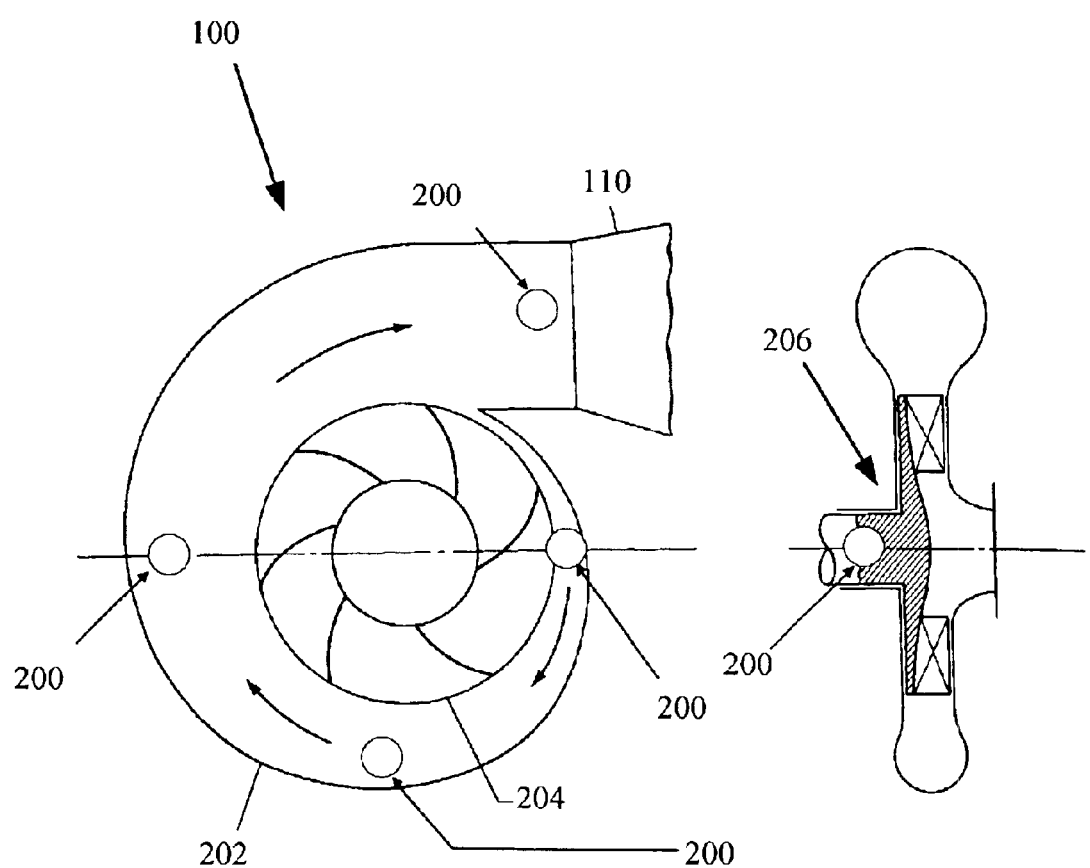
FIG. 13 is a cross-sectional side view of an embodiment of a pump housing having acoustic emission sensors.

FIG. 13 shows the centrifugal pump 100 and a set of acoustic emission sensors 200. In particular, FIG. 13 shows the volute 202 of the pump 100 as it extends from the rotor 204 toward the output 110. Acoustic emission sensors 200 are placed along the exterior of the volute 202 and on the exterior adjacent the eye of the impeller 206. The acoustic emission sensors 200 may comprise any suitable acoustic sensor. In one specific embodiment, for instance, the acoustic emission sensors 200 comprise PINDUCER VP-1093 acoustic emission sensors manufactured by Valpey Fisher Corporation. Further, a variety of sensor arrays may be used to measure acoustic emission related to cavitation. For instance, as shown in FIG. 13, four acoustic emission sensors 200 are placed intermittently along the exterior of the volute 202, whereas only a single acoustic emission sensor is placed adjacent the eye of the impeller 206. Any number of acoustic emission sensors, however, may be used. For example, the acoustic emission sensor system may comprise only a single sensor 200 located on the exterior of the pump housing and adjacent the eye of the impeller 206.

During operation, the output of the acoustic emissions sensors 200 may be sampled at some predetermined sampling rate (e.g., 500 MHz). The signal may be filtered (e.g., with a high-pass filter having a 1 MHz cutoff) in order to remove undesired system noise (e.g., noise caused by a variable frequency drive). The resulting signal can be analyzed by a computer-based analysis system to detect the cavitation characteristics of the pump. For instance, the acoustic emission sensor system can be used in conjunction with traditional operational instruments that detect motor current, suction pressure and temperature, and discharge pressure, temperature, and flow in order to determine the pressure at which cavitation begins (the incipient cavitation point) and the pressure at which cavitation is at its greatest (the maximum cavitation point). An FFT of the resulting signal can be calculated to obtain a spectral analysis of the acoustic energy.

Figure 14:
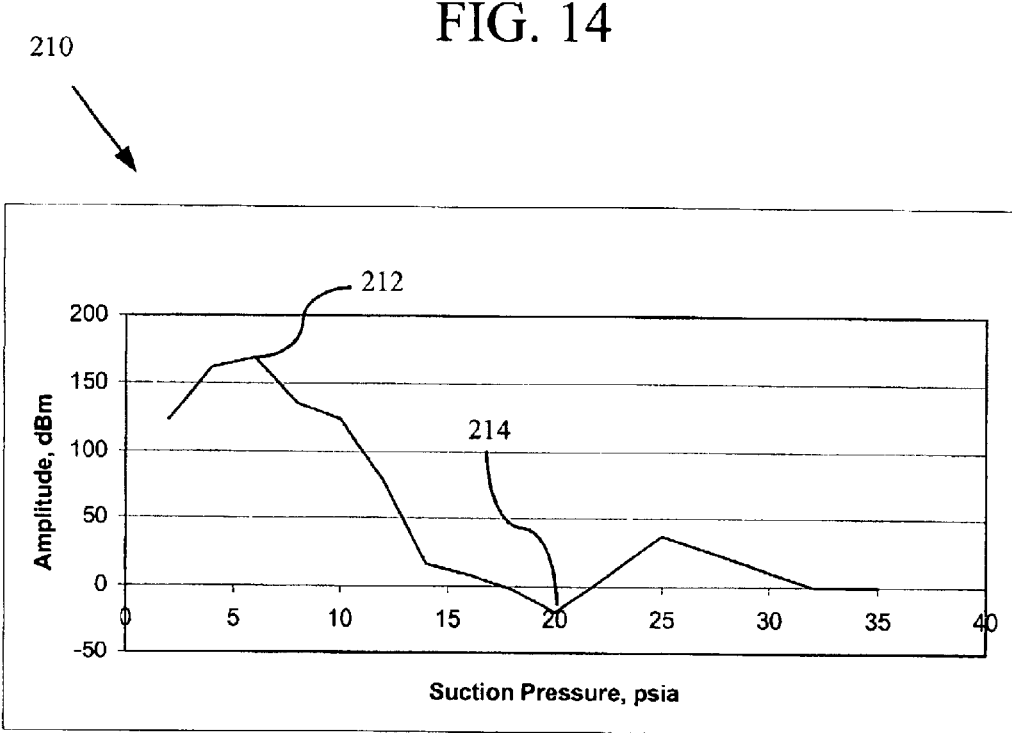
FIG. 14 is a set of data obtained using an embodiment of an acoustic emission sensor system.

FIG. 14 shows an exemplary graph 210 of data obtained from an acoustic emission sensor placed adjacent the eye of the impeller 206. A series of tests were run where the pump 100 was run under varied suction pressures—from well above the manufacturer's suggested Net Positive Suction Head (NPSH) to the minimum suction pressure that the pump would produce. Acoustic spectra were captured for each case and their respective FFTs were produced. By integrating between 30 and 50 KHz and normalizing the cavitation acoustic spectra to the base case (i.e., no cavitation), the graph shown in FIG. 14 was obtained. As seen in FIG. 14, the maximum cavitation point 212 occurs at a suction pressure of about 5 psia, whereas the incipient cavitation point 214 occurs at a suction pressure of about 20 psia.

By performing operational runs using the instrumentation described above and measuring the amount of physical degradation during the course of the run, a degradation rate (or an empirically determined degradation formulation) can be correlated with the stressor intensity, thereby allowing the prognostic methods discussed above to be utilized. The measured data can be analyzed (in real time or otherwise) by a computer-based analysis system to provide the operator with an accurate prediction of the pump's residual life as a result of cavitation and to provide the operator with a clear picture of whether adjustments to the operational parameters of the pump reduce or increase the intensity of the stressor.

For instance, in one working example of the embodiment, an equation relating stressor intensity to a physical degradation rate was derived. To derive the equation, baseline measurements on a test pump were taken. A continuous cavitation run was initiated and continued twenty-four-hours-a-day for four weeks. The test pump was secured, drained, and disassembled to obtain wear readings relative to the baseline measurements. With the exception of the wear ring clearances, very little metal removal was observed. The impeller to volute gap in this area indicated a 10 mil increase in clearance. Without performing further cavitation runs, only a simple linear degradation increment could be derived form the available two-point data set. When combined with the nonlinear acoustic intensity measurement data, the data produced a "zeroth order" approximation of a correlation that relates the suction pressure differential to the degradation rate of the pump. After making several assumptions concerning the effects of a logarithmic intensity scale, an equation of the following form was derived:

$$MRR = K[10\ \exp(13.9 \times (PSID_{npsh}))] \times T \qquad (7)$$

where MRR is the metal removal rate, K is a material and geometric constant dependent on the specific pump, the coefficient 13.9 is the slope of the (logarithmic) acoustic intensity from FIG. 14 in dB/psid, $PSID_{npsh}$ is the differential pressure between the operating point and the pump NPSH limit, and T is the cavitation time in days.

Having illustrated and described the principles of the illustrated embodiments, it will be apparent to those of ordinary skill in the art that the embodiments can be modified in arrangement and detail without departing from such principles.

For example, the general methods disclosed can be utilized in any machine prone to or exhibiting degradation caused by a stressor. The general methods may also be described and discussed in an operations manual. Further, with respect to the pump-motor system, other methods and systems for measuring vibration and/or cavitation can be utilized. For instance, a system utilizing accelerometers can be used to obtain the relevant vibrational data of the pump-motor system.

Moreover, any of the measurement systems or positioning systems discussed herein can be used in conjunction with any of the other measurement systems discussed herein or known to those of ordinary skill in the art. For instance, an extensive set of data concerning the effects of misalignment on a laboratory pump-motor system was acquired by performing the following tests using both the dynamic laser alignment system of the first representative embodiment and the load cell system of the second representative embodiment. First, the pump-motor system was aligned using a traditional alignment method and baseline data was obtained. The baseline data showed resonant peaks at 30 Hz and 60 Hz. Next, a set of "best tune" data was obtained. The "best tune" data was obtained by attempting to statically and dynamically minimize the vibration measurements from the dynamic laser alignment system and the load cell system at 30 Hz and 60 Hz using the tri-planar positioning platforms. Incremental speed testing was performed while the pump-motor system was in the "best tune" state and a resonance peak frequency was found. Incremental angular misalignment measurements were taken. Starting from the "best tune" position, the positioning platforms were incrementally adjusted (e.g., shifting the inboard platforms by 5 mil increments and the outboard platforms by 10 mil increments to rotate the motor in a clockwise or counter-clockwise motion). Parallel misalignment measurements were taken by adjusting the positioning platforms in small parallel increments. Rotational imbalance data was obtained by attaching an appropriately sized hose clamp around the motor side of the coupling flange between the drive shaft and the impeller shaft. After compensating for the weight of the clamp, small eccentric weights were incrementally added to the clamp during multiple test intervals until a clear indication of rotational imbalance was detected.

In view of the many possible embodiments, it will be recognized that the illustrated embodiments include only examples and should not be taken as a limitation on the scope of the invention.

What is claimed is:

1. A method of operating a machine, comprising:
   identifying a degradation mechanism that can affect performance of the machine;
   identifying a stressor related to the degradation mechanism;
   measuring a stressor intensity at multiple time intervals;
   representing a degradation rate at which the degradation mechanism affects the performance of the machine as a function of the stressor intensity; and
   calculating a predicted performance of the machine using the representation of the degradation rate as a function of the stressor intensity.

2. The method of claim 1, further comprising:
   representing the stressor intensity as a function of time;
   calculating a precursive indicator of the degradation mechanism from the representation of the stressor intensity as a function of time; and
   using the precursive indicator to calculate the predicted performance.

3. The method of claim 2, further comprising adjusting operational parameters of the machine based on the precursive indicator.

4. The method of claim 1, wherein the calculating is performed by integrating the representation of the degradation rate as a function of the stressor intensity.

5. The method of claim 1, wherein the measuring and calculating are performed substantially continuously during operation of the machine.

6. The method of claim 1, further comprising calculating a remaining life of the machine using the predicted performance of the machine.

7. The method of claim 1, wherein the representing comprises:
   obtaining a first measurement of machine degradation caused by the degradation mechanism;
   applying the degradation mechanism at a fixed stressor intensity for a fixed period of time;
   obtaining a second measurement of the machine degradation caused by the degradation mechanism; and
   calculating a function that correlates the rate of degradation as determined by the first measurement and the second measurement with the fixed stressor intensity.

8. A method of operating a machine, comprising:
   identifying a degradation mechanism affecting performance of the machine;
   identifying a stressor related to the degradation mechanism;
   measuring a stressor intensity at multiple time intervals;
   representing the stressor intensity as a function of time; and
   calculating a precursive indicator of the degradation mechanism from the representation of the stressor intensity as a function of time.

9. The method of claim 8, wherein the precursive indicator is the rate of change in the stressor intensity and the calculating is accomplished by calculating the first time derivative of the representation of the stressor intensity as a function of time.

10. The method of claim 8, wherein the precursive indicator is the root indicator and the calculating is accomplished by calculating the second time derivative of the representation of the stressor intensity as a function of time.

11. The method of claim 8, wherein the measuring and calculating are performed substantially continuously during operation of the machine.

12. The method of claim 8, further comprising adjusting operational parameters of the machine based on the precursive indicator.

13. The method of claim 8, further comprising calculating a predicted performance of the machine using the precursive indicator.

14. The method of claim 8, wherein multiple precursive indicators are calculated.

15. A method of operating a machine, comprising:
measuring an intensity of a stressor that can cause degradation in a machine;
calculating one or more precursive indicators using a precursive relationship between the intensity of the stressor and machine performance; and
reporting the precursive indicator, wherein the measuring, calculating, and reporting are performed substantially continuously during the operation of the machine.

16. The method of claim 15, further comprising adjusting operational parameters of the machine based on the one or more precursive indicators.

17. The method of claim 15, further comprising calculating a remaining life of the machine using the precursive relationship, the calculating being performed substantially continuously during the operation of the machine.

18. The method of claim 15, wherein one of the precursive indicators is a rate of change in the intensity of the stressor.

19. The method of claim 15, wherein one of the precursive indicators is a gradient of the intensity of the stressor.

20. A rotating machinery system, comprising:
a motor having a rotating drive shaft;
a machine component coupled to and driven by the drive shaft;
a laser light source positioned adjacent the drive shaft to produce a beam of laser light; and
one or more laser targets coupled to the motor or the machine component, the laser targets being configured to measure the displacement of the target from a beam path and being configured to take the measurements substantially continuously.

21. The system of claim 20, further comprising one or more positioning platforms on which the motor is mounted, the positioning platforms being configured to adjust the motor and the drive shaft with respect to the machine component.

22. The system of claim 20, further comprising a computer-based analysis system coupled to the one or more laser targets, the computer-based analysis system being configured to analyze the measurements of the one or more targets during operation of the motor and to calculate a vibration intensity.

23. The system of claim 22, wherein the computer-based analysis system further calculates an alignment of the drive shaft with the machine component.

24. The system of claim 22, wherein the computer-based analysis system further calculates a predicted performance of the machine component or the motor based on the vibration intensity.

25. The system of claim 22, wherein the computer-based analysis system further calculates a precursive indicator.

26. The system of claim 20, wherein the machine component is a pump.

27. A machine diagnostic and prognostic system comprising:
a machine component whose performance may be affected by vibration;
a laser light source positioned adjacent the machine component to produce a beam of laser light;
one or more laser targets coupled to the machine component, the laser targets being configured to measure the displacement of the target from a beam path; and
a computer-based analysis system coupled to the one or more laser targets, the computer-based analysis system configured to analyze the measurements of the one or more targets during operation of the motor and to calculate a vibration intensity.

28. The system of claim 27, wherein the computer-based analysis system further calculates a predicted performance of the machine component or the motor based on the vibration intensity.

29. The system of claim 27, wherein the computer-based analysis system further calculates a precursive indicator.

30. The system of claim 27, wherein the laser targets are configured to take the measurements substantially continuously.

31. A rotating machinery system, comprising:
a motor;
a rotating armature positioned within the motor;
a drive shaft coupled with the armature;
a machine component coupled with an inboard end of the drive shaft, the machine component being operated by rotation of the drive shaft;
a radial bearing through which the drive shaft extends, the radial bearing being housed in a radial bearing housing of the motor; and
one or more load cells positioned in the radial bearing housing, each of the load cells being configured to measure a force exerted on the respective load cell by the drive shaft.

32. The system of claim 31, wherein the one or more load cells are ultra-thin load cells.

33. The system of claim 31, wherein the one or more load cells are frictionally supported between the radial bearing and the radial bearing housing.

34. The system of claim 33, wherein the frictional support is accomplished by positioning the one or more load cells between an outer shim and an inner shim.

35. The system of claim 31, wherein the one or more load cells are configured to take the measurements substantially continuously.

36. The system of claim 31, further comprising a computer-based analysis system coupled to the one or more load cells, the computer-based analysis system being configured to analyze the measurements of the one or more load cells during operation of the motor and to calculate a vibration intensity.

37. The system of claim 36, wherein the computer-based analysis system further calculates a remaining operating life of the motor based on the vibration intensity.

38. The system of claim 36, wherein the computer-based analysis system further calculates a precursive indicator based on the load cell measurements.

39. The system of claim 31, further comprising:
a motor housing extension integrally connected with the motor and positioned adjacent an outboard end of the drive shaft; and
an axial load cell positioned within the motor housing extension and axially adjacent to the outboard end of the drive shaft, the axial load cell being configured to measure an axial force exerted by the drive shaft.

40. A pump, comprising:
a pump housing having an input and an output;

an impeller portion of the pump housing;

a volute portion of the pump housing, the volute portion being positioned adjacent the impeller portion and connecting with the output; and one or more acoustic emission sensors positioned on an exterior of the pump housing, the acoustic emission sensors being configured to measure the intensity of cavitation occurring within the pump housing.

41. The pump of claim 40, wherein the acoustic emission sensors are configured to measure the intensity of the cavitation substantially continuously.

42. The pump of claim 40, wherein the one or more acoustic emission sensors comprise a single acoustic emission sensor positioned on the exterior of the pump housing adjacent an eye of the impeller portion.

43. The pump of claim 40, further comprising a computer-based analysis system coupled to the one or more acoustic emission sensors, the computer-based analysis system being configured to analyze the measurements of the one or more acoustic emission sensors during operation of the pump and to calculate a cavitation intensity.

44. The system of claim 43, wherein the computer-based analysis system further calculates a remaining operating life of the pump based on the cavitation intensity.

45. The system of claim 43, wherein the computer-based analysis system further calculates a precursive indicator based on the cavitation intensity.

46. An operations manual for operating machinery, the manual instructing an operator to:

measure an intensity of a stressor causing degradation in a machine;

calculate one or more precursive indicators using a precursive relationship between the intensity of the stressor and machine performance; and adjust the machinery based on the one or more precursive indicators.

* * * * *